United States Patent [19]
Goto et al.

[11] 3,957,444
[45] May 18, 1976

[54] CONTROL SYSTEM FOR EXHAUST GAS PURIFYING DEVICE

[75] Inventors: Kenji Goto; Norio Shibata, both of Susono, Japan

[73] Assignee: Toyota Jidosha Kogyo Kabushiki Kaisha, Japan

[22] Filed: Dec. 27, 1974

[21] Appl. No.: 536,985

Related U.S. Application Data
[63] Continuation of Ser. No. 319,682, Dec. 29, 1972.

[30] Foreign Application Priority Data
May 16, 1972  Japan.............................. 47-47729

[52] U.S. Cl.............................. 23/288 FA; 60/277; 60/288
[51] Int. Cl.² ....................... B01J 8/02; F01N 3/10; F01N 3/15
[58] Field of Search ...... 23/288 F, 288 FA, 288 FB, 23/288 FC, 230 A, 253 A; 60/285, 288, 286, 277; 236/78 R, 78 D; 235/150.1, 150.3, 151.12, 151.13, 151.34

[56] References Cited
UNITED STATES PATENTS

| | | |
|---|---|---|
| 3,017,749 | 1/1962 | Heppler et al................ 236/78 D X |
| 3,680,318 | 8/1972 | Nakajima et al.................. 60/288 X |
| 3,696,618 | 10/1972 | Boyd et al...................... 23/288 F X |
| 3,770,946 | 11/1973 | Fertik et al...................... 235/150.1 |
| 3,851,469 | 12/1974 | Eichler et al. ......................... 60/288 |

Primary Examiner—Morris O. Wolk
Assistant Examiner—Michael S. Marcus
Attorney, Agent, or Firm—Toren, McGeady and Stanger

[57] ABSTRACT

In the device disclosed, a catalytic converter purifies exhaust gas from an engine. A sensor measures the temperature of the converter and an amplifier amplifies the measurement to produce a temperature signal. A differentiator produces a time-differential of the signal multiplied by a constant representing the time constant of the sensor. An operating circuit adds the multiplied time-differential to the signal to produce a voltage that is compensated for the response delay of the temperature sensor. Electromagnetic relays respond to the voltage by diverting the gases and the secondary air around the converter.

9 Claims, 4 Drawing Figures

CONTROL SYSTEM FOR EXHAUST GAS PURIFYING DEVICE

This is a continuation of application Ser. No. 319,682, filed Dec. 29, 1972.

BACKGROUND OF THE INVENTION

This invention relates to a control system for exhaust gas purifying devices, and more particularly to a control system which prevents overheating of the exhaust gas purifying device.

Temperature sensors have been successfully installed on exhaust gas purifying devices such as intake-type thermal reactors, catalytic converters, afterburners, and similar devices. These sensors prevent the purifying devices from overheating. Heat generation resulting from the purifying operation is suppressed by stopping the operation before the sensor indicates that the heat-resisting critical temperature of the purifying device has been reached. However, in practice the responses of temperature sensors are subject to delays. Thus, if the temperature of the purifying device rises sharply, the sensor may not indicate quickly enough that the heat-resisting critical temperature of the purifying device has been reached. As a result, heat may destroy the purifying device.

An object of this invention is to improve gas purifying systems.

Another object of this invention is to insure safe operation of gas purifying devices.

Still another object of this invention is to compensate for the aforementioned delay in the response of the temperature sensor.

SUMMARY OF THE INVENTION

According to a feature of this invention, the output signal of a temperature sensor which senses the temperature of an exhaust gas purifying device is added to a signal obtained by multiplying a constant corresponding to the time constant of the temperature sensor by a time-differential of the output signal. This produces a corrected signal corresponding to the actual temperature of the exhaust gas purifying device.

According to another feature of the invention, the operation of the exhaust gas purifying device is interrupted when the corrected signal, which corresponds to the actual temperature of the purifying device, exceeds a predetermined value. As a result the purifying device is reliably protected from destruction.

According to another feature of the invention, electronic circuits perform the mathematical manipulations so that the overall dimensions of the system can be substantially reduced.

These and other features of the inventions are pointed out in the claims. Other objects and advantages of the invention will become evident from the following detailed description when read in light of the accompanying drawings.

DETAILED DESCRIPTION OF PREFERRED EMBODIMENTS

Figure 1:
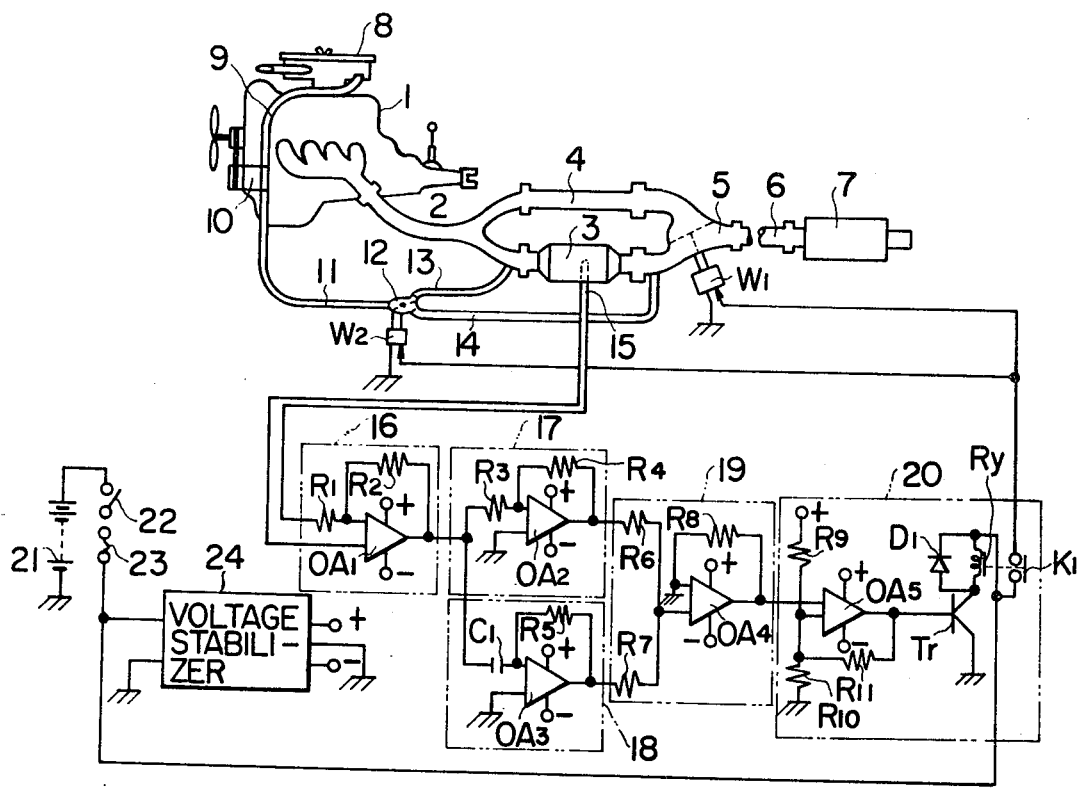
FIG. 1 schematically illustrates an internal combustion engine exhaust gas purifying system embodying features of the invention, and including a temperature control system embodying features of the invention.

In FIG. 1 exhaust gases from an internal combustion engine 1 pass through a front exhaust pipe 2. They then branch through a catalytic converter 3 and bypass 4. An electromagnetic change-over or 3-way valve 5, which is operated by an exciting-winding W1, at the outlet of the converter 3 and the bypass 4 determines whether the gases will pass through the catalytic converter 3 or the bypass 4. That is to say, the valve 5 preferentially passes the gases through the catalytic converter 3 or through the bypass 4. The gases ultimately pass through a rear exhaust pipe 6 and a muffler 7 in series with the rear exhaust pipe.

An air cleaner 8 supplies fresh air into the internal combustion engine 1. A pump 10 for secondary purifying air serves to supply part of the air fed into the air cleaner 8 into a pipe 11. An electromgnetic valve 12 having an exciting winding W2 selectively connects the pipe 11 to either a pipe 13 or a pipe 14. The valve 12 thus selectively passes the air to the inlet of the catalytic converter 3 through the pipe 13 or to the outlet of the catalytic converter 3 through the pipe 14. In the position shown, the valves 5 and 12 respectively pass the exhaust gases through the catalytic converter 3 and the secondary purifying air to the inlet of the converter. Under these circumstances the converter 3 is performing its exhaust gas purifying operation.

A temperature sensor 15 in the catalytic converter 3 is connected to the input terminal of a preamplifying stage 16. There an operational amplifier OA1 having an input resistor $R_1$ and a feedback resistor $R_2$ multiplies the signal from the sensor by a value $R_2/R_1$. The output of the amplifying stage 16 is connected to a phase-inverting stage 17. There an operational amplifier OA2 having an input resistor $R_3$ and a feedback resistor $R_4$ equal to the input resistor $R_3$, inverts the phase of the signal from the amplifying stage 16. The output terminal of the amplifying stage 16 is also connected to a differentiating stage 18. There an operational differentiator OA3 having an input condenser $C_1$ and a feedback resistor $R_5$ differentiates the output of the stage 16. Differentiator stage 18 is constructed so that the product of the values of the feedback resistance $R_5$ and the input capacitance $C_1$ correspond to the time constant of the temperature sensor 15.

The output terminals of the phase-inverting stage 17 and the differentiating stage 18 are respectively connected to the input terminal of an adding stage 19. There an operational amplifier OA4 having a pair of input resistors $R_6$ and $R_7$ and a feedback resistor $R_8$, all equal to each other, adds the differentiated value of the output of stage 16 to the inverted value. An operating unit 20 receives the output of the adding stage 19. In the operating unit an operational amplifier OA5 receives one input at its non-inverting input terminal from the output terminal of the adding stage 19. The inverting input terminal of the amplifier OA5 receives a voltage, formed by voltage dividing resistors $R_9$ and $R_{10}$, which corresponds to the heat-resisting critical temperature of a catalyst in the catalytic converter 3. A feedback resistor $R_{11}$ forms part of the operational amplifier OA5. In the stage 20, a transistor Tr receives the output of the operational amplifier OA5 at its base. The transistor Tr operates a relay Ry when the output of the stage 19 exceeds the value set by the resistors $R_9$ and $R_{10}$, thereby indicating that the temperature in the converter 3 exceeds or is about to reach the heat-resisting critical temperature of the catalyst as set by the resistors $R_9$ and $R_{10}$.

A diode D1 connected in parallel with the relay Ry prevents the development of an overvoltage in the coil of the relay when the transistor is conductive. The collector circuit of the transistor Tr is connected to a DC power supply 21 through a switch 22 and a fuse 23. A voltage stabilizer or regulator 24 connected to the power supply 21 serves to apply a stabilized voltage to the stages 16, 17, 18, 19, and 20. A contact K1 of the relay Ry connects the power supply 21 to the exciting winding W1 and W2 of the valves 5 and 12, thereby operating these valves when the relay Ry is energized.

When a temperature in the catalytic converter 3 is less than a predetermined value, the electromagnetic valve 5 is situated as shown by the broken line. Thus, the exhaust gas from the internal combustion engine 1 flows through members 2, 3, 5, 6, and 7. At the same time, the valve 12 is in the position shown by the broken line. Consequently, secondary air is supplied through the pipe 13 to the inlet of the catalytic converter 3. Thus, noxious components in the exhaust gases are removed by an oxidation reaction within the converter.

When excessive unreacted noxious components pass into the catalytic converter due to trouble in the internal combustion engine 1, such as miss fire or excessive concentration of the gas mixture, the amount of heat generated from the reaction increases. This raises the temperature in the converter. The sensor 15 detects the temperature in the catalytic converter.

It is assumed that the temperature $\theta s$ indicated by the electric output signal of the sensor 15 responds to the actual temperature $\theta o$ of the converter 3 with a primary delay. The Laplace transformation of $\theta s$ is as follows:

$$\alpha \Theta s = \int_0^\infty \Theta s \exp(-st)dt \quad (s \text{ is a complex number}) \quad (1)$$

The Laplace transformation of $\theta o$ is expressed as follows: t,91

$$\alpha \Theta o = \int_0^\infty \Theta O \exp(-st)dt \quad (2)$$

The expression of the system with the primary delay using Laplace transformation is as follows:

$$\alpha \Theta s / \alpha \Theta o = \frac{k}{1 + sT} \quad (3)$$

Although k and T are constants, $k = 1$, because under steady state conditions $\theta s$ agrees with $\theta o$. The value T is the time constant of the sensor 15. In view of the above equation (3) can be expressed as follows:

$$\alpha \Theta s / \alpha \Theta o = \frac{1}{1 + sT} \quad (3)'$$

The equation (3)' can be rewritten as follows:

$$\alpha \Theta s \times (1 + sT) = \alpha \Theta o \quad (4)$$

The inverse Laplace transformation of both sides of equation (4) will produce the following results:

$$\alpha^{-1}\{(\Theta s)\} = \Theta s \quad \alpha^{-1}(s \cdot \Theta s) = \frac{d}{dt}\Theta s$$

Finally the following formula is established.

$$\Theta s + T \cdot \frac{d}{dt}\Theta s = \Theta o \quad (5)$$

Equation (5) expresses the general form of the relation between the indicator temperature of the sensor 15 and the actual temperature of the converter 3. In other words, the actual temperature $\theta o$ can be obtained by adding the indicator temperatures $\theta s$ of the sensor 15 to the product of the time gradient $d\theta s/dt$ of the temperature $\theta s$ and the time constant T of the sensor.

Figure 2:
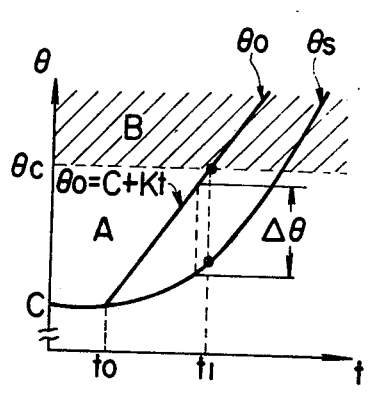
FIG. 2 is a graph illustrating the relationship between the temperature rise of exhaust gases in the exhaust gas purifying device of FIG. 1, and the response of the exhaust gas temperature sensor.

In FIG. 2 the abscissa is time and the ordinate is temperature $\theta$. Here $\theta o$ increases at a specific gradient from the time $t = t_0$. It illustrates the time variation of $\theta o$ and $\theta s$ with respect to time.

Figure 3:
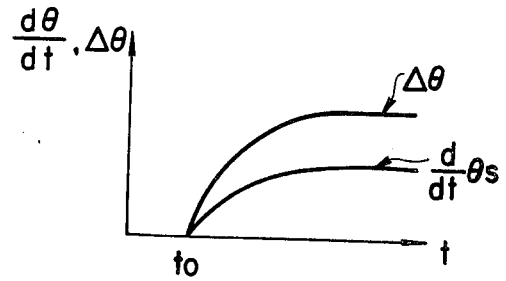
FIG. 3 is a graph showing the difference between the temperature indicated by the sensor and the actual temperature, and the time-differentiated values of the indicated temperatures.

In FIG. 3 the abscissa is time and the ordinate is the temperature $\theta$ as well as the time differential $d\theta/dt$ of temperature. The Figure illustrates the time variation of the difference $\Delta\theta$ between $\theta o$ and $\theta s$, that is $\Delta\theta = \theta o - \theta s$, as well as the time variation in the temperature gradient $d\theta s/dt$. The temperature $\theta s$ with respect to the temperature $\theta o$ is determined as follows by using Laplace transformation:

$$\alpha \Theta o = \int_0^\infty (C + Kt) \cdot \exp(-st)dt = \frac{C}{s} + \frac{K}{s^2} \quad (6)$$

(wherein C and K are the constants). Using equation (3)' we obtain:

$$\alpha \Theta s = \frac{1}{1 + sT} \alpha \Theta o = \frac{1}{1 + sT} \cdot \left(\frac{C}{s} + \frac{K}{s^2}\right) \quad (7)$$

Modifying equation (7) we obtain:

$$\alpha \Theta s = \frac{C}{s} \cdot \frac{1}{1 + sT} + \frac{K}{s^2} \cdot \frac{1}{1 + sT} \quad (7)'$$

The inverse Laplace transformation of both sides of equation (7)' produces the following:

$$\alpha^{-1} \frac{1}{s} \frac{1}{1 + st} = \int_0^t \left(\alpha^{-1} \frac{1}{1 + st}\right)dt$$

$$\Theta s = C \cdot \int_0^t \left(\alpha^{-1} \frac{1}{1 + st}\right)dt + K \int_0^{t_1} \left\{\int_0^t \left(\alpha^{-1} \frac{1}{1 + sT}\right)dt\right\}dt \quad (8)$$

Since $$\alpha^{-1} \frac{1}{1+sT} = \alpha^{-1} \frac{\frac{1}{T}}{\frac{1}{T}+s} = \frac{1}{T} \exp\left(\frac{t}{-T}\right) \quad (9)$$

we obtain:

$$\int_o^t \frac{1}{T} \exp\left(\frac{t}{-T}\right) dt = \left[-\exp\left(\frac{-t}{T}\right)\right]\int_o^t = \left\{1 - \exp\left(\frac{-t}{T}\right)\right\} \quad (10)$$

$$\int_o^t \left\{1 - \exp\left(\frac{-t}{T}\right)\right\} dt = \left[t + T\exp\left(-\frac{t}{T}\right)\right]\int_o^t = t + T\exp\left(\frac{-t}{T}\right) - T \quad (11)$$

From equations (8), (10), and (11)

$$\Theta s = C\left\{1 - \exp\left(\frac{-t}{T}\right)\right\} + Kt + KT\exp\left(\frac{-t}{T}\right) - KT \quad (12)$$

From equation (12)

$$\Delta\Theta = \Theta o - \Theta s = C + Kt - C + C\exp\left(\frac{-t}{T}\right) - Kt - KT\exp\left(\frac{-t}{T}\right) + KT$$

$$= -(KT - C)\exp\left(\frac{-t}{T}\right) + KT \quad (13)$$

Moreover, $$\frac{d}{dt}\Theta s = \frac{1}{T} C\exp\left(\frac{-t}{T}\right) + K - K\exp\left(\frac{-t}{T}\right) \quad (14)$$

From equations (13) and (14), it is apparent that the following formula is established:

$$\Delta\Theta = T \frac{d}{dt}\Theta s \quad (15)$$

In FIG. 1, the signal $e_1$ of the sensor 15 is amplified $R_2/R_1$ times by the preamplifying stage 16. The phase of the signal is inverted at this stage. The signal is returned to its initial phase by means of the phase-inverting stage 17. The output of the differentiating stage 18 to which the input $$-\frac{R_2}{R_1} e_i$$

is applied is $$-\left(\frac{R_2}{R_1} R_5 C_1 \frac{d}{dt} e_i\right).$$

Consequently $$\frac{R_2}{R_1} e_i \text{ and } \frac{R_2}{R_1} R_5 C_1 \frac{d}{dt} e_i$$

appear at the non-inverting input terminal of the adding stage 19. The output thereof is $$\frac{R_2}{R_1}\left(e_1 + R_5 C_1 \frac{d}{dt} e_i\right).$$

If $e_i$ varies linearly with $\theta s$, it is apparent from the above that the output of the adding stage 19 is proportional to the temperature $\theta o$. When the temperature $\theta o$ exceeds the heat-resisting critical temperature $\theta c$ it is desirable that the operation of the converter be stopped. The heat-resisting critical temperature $\theta c$ of the catalyst in the converter 3 is established at the dividing resistors $R_9$ and $R_{10}$. Thus, when $\theta o$ enters the region B shown in FIG. 2, the value at the output of the stage 19 exceeds the value established by the resistors $R_9$ and $R_{10}$ and the transistor Tr is rendered conductive. This energizes the relay Ry.

As a result of the energization of relay Ry, the valves 5 and 12 are energized and pass the exhaust gases from the internal combustion engine 1 through the bypass 4. Moreover, these valves pass the secondary air from the pump 10 through the pipe 14 to bypass the converter 3. This prevents the converter from being overheated. Accordingly, as long as the system is operating normally, the temperature of the converter is always maintained within the safety region as shown in FIG. 2.

The embodiment of the invention illustrated in FIG. 1 compensates for the response delay of the temperature sensor. It is also possible to compensate for the time delay of the temperature rise due to the thermal capacity of the catalytic converter 3 itself. This involves utilizing the changes in the temperature $\theta o$ at the time of trouble in a malfunction of the engine 1. In other words, where it is expected that the temperature of the converter 3 may exceed the heat-resisting critical temperature $\theta c$, the aforementioned and described control can be accomplished before $\theta o$ reaches $\theta c$. Under these circumstances the electromagnetic valves 5 and 12 are controlled and shifted from the positions shown by means stage 19 to the value obtained by multiplying the differentiated value of the output by the time constant of the temperature rise in the catalytic converter 3. In this way, it is possible to eliminate problems arising from response delays of the control signal when the flow of the actual secondary air or exhaust gas changes. In this way, the response of the whole control mechanism is improved.

Figure 4:
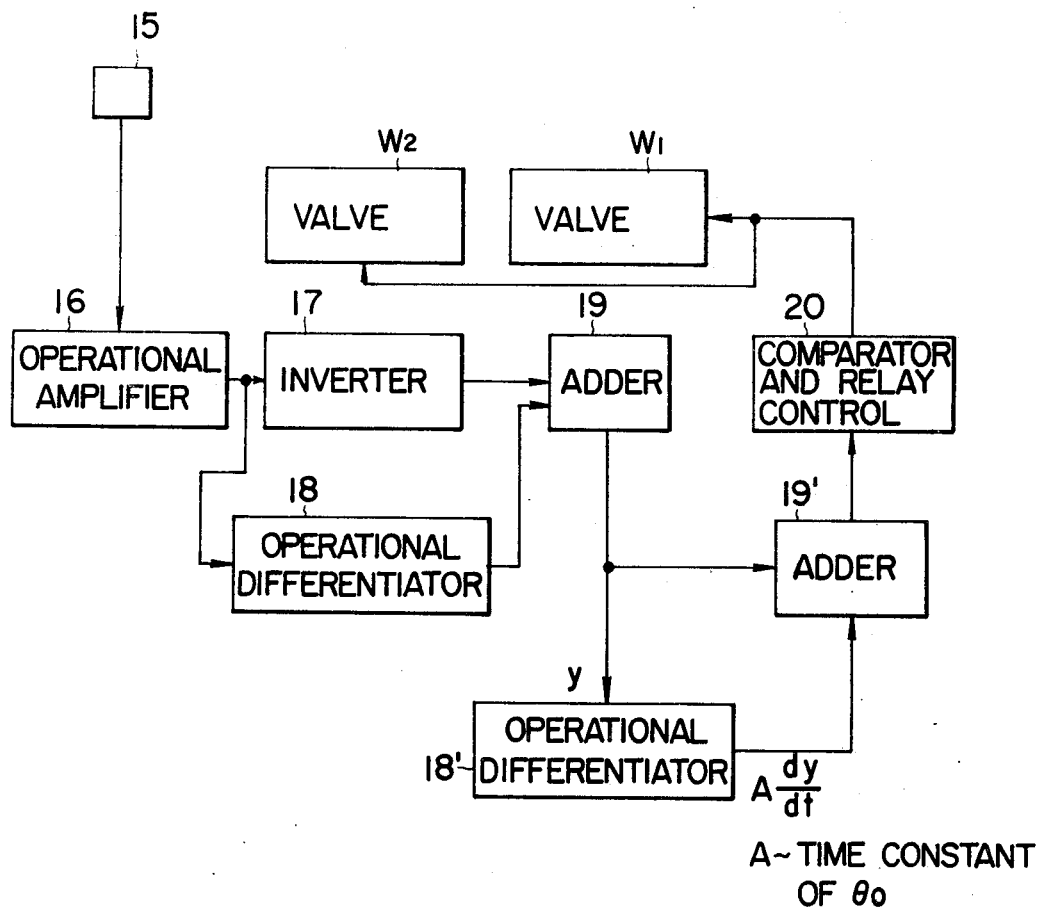
FIG. 4 is a schematic diagram illustrating a circuit diagram to be substituted for the electrical circuitry in FIG. 1 according to another embodiment of the invention.

The electrical portion of the apparatus embodying this principle is illustrated in FIG. 4 where the reference characters of FIG. 1 are used to designate like parts in FIG. 4. The circuit of FIG. 4 connects to the mechanical portion of the purifying system in FIG. 1 and together forms an overall system embodying features of the invention.

The invention has a number of advantages. For example, it offers great flexibility and insures exceedingly desirable response characteristics. This is due to the fact that compensation of the response characteristic is carried out on a theoretical basis in the portion of the system involving temperature calculations, namely, the differentiating stage and the adding stage. Moreover, not only the response delay of the sensor but also the time for the temperature rise in the catalytic converter, as well as the response to the whole system, including the operating units such as 5 and 12, can be improved.

The sensor itself, especially its characteristics such as its response, can be improved only up to a point due to manufacturing restrictions, heat resistance, durability, etc. However, according to the present invention, the effects of defects in the sensor itself can be eliminated. This allows for wide flexibility in the construction of the sensor itself. It allows the whole system to be constructed for optimum operation. This affords the advantage of improving the quality and reducing the cost.

While embodiments of the invention have been described in detail it will be obvious to those skilled in the art that the invention may be embodied otherwise without departing from its spirit and scope.

We claim:

1. In a gas purifying system of the type having a catalytic converter for purifying gas from a source, the improvement comprising a temperature control system, said system including:

by-pass means for directing a predetermined portion of said gas to be purified away from said purifying means;

valve means for blocking or opening the by-pass means;

temperature sensor means being disposed in said catalytic converter for producing an electrical output corresponding to the temperature of the catalytic converter, said temperature sensor means having a time constant associated therewith;

means responsive to said sensor means for producing a first electrical signal directly proportional to the output of said sensor means;

means responsive to said first signal means for producing a second electrical signal proportional to the differentiated value of the sensor output with respect to time, said proportionality including a multiplicative constant corresponding to the time constant of the sensor means;

means responsive to said first signal for phasing said first signal;

means for adding said phased first signal and said second signal to develop a third electrical signal corresponding to a calculated temperature;

and means responsive to said third signal for determining whether said third signal exceeds a predetermined value for supplying a control signal to said valve means.

2. A system as in claim 1, wherein said differentiating means for producing a second signal includes an operational differentiator having a feedback resistance and an input capacitance, the product of the values of the feedback resistance and input capacitance corresponding to the time constant of the temperature sensor.

3. A system as in claim 1, wherein said valve means is located in an outlet of said by-pass means.

4. A system as in claim 1, wherein said catalytic converter includes an air inlet passage, and wherein there is also included valve means to control said air inlet passage, said air inlet valve means also responsive to said control signal, said air inlet valve means for allowing passage of air to said passage when the third signal is below a predetermined value and for diverting the air around said portion when the third signal is more than the predetermined value.

5. A system as in claim 1 also including second differentiating means responsive to said adding means for differentiating the third signal to produce a fourth signal, and second adding means for adding the fourth signal to the third signal, said second differentiating means multiplying the differentiated value by a constant corresponding to the time constant of said catalytic converter.

6. The system of claim 1, wherein said means for producing a first signal proportional to the output of the temperature sensor means includes an amplifier and said phasing means includes an inverter to effect the appropriate phase of said first signal with respect to said second signal.

7. The system of claim 6, wherein said differentiator means for producing a second signal is responsive to the output of said amplifier.

8. The system of claim 1, wherein said means responsive to said third signal includes a comparator circuit for comparing said third signal with a reference signal.

9. A system as in claim 8, wherein said comparator means includes a relay for producing the control signal.

* * * * *